(12) United States Patent
Meli et al.

(10) Patent No.: US 7,512,336 B1
(45) Date of Patent: Mar. 31, 2009

(54) OPTICAL FAILURE DETECTION USING POLARIZATION

(75) Inventors: Fausto Meli, Piacenza (IT); Valerio Viscardi, Paderno Dugnano (IT)

(73) Assignee: Cisco Technology, Inc., San Jose, CA (US)

( * ) Notice: Subject to any disclaimer, the term of this patent is extended or adjusted under 35 U.S.C. 154(b) by 797 days.

(21) Appl. No.: 10/866,427

(22) Filed: Jun. 10, 2004

(51) Int. Cl.
*H04B 10/08* (2006.01)
*H04B 17/00* (2006.01)

(52) U.S. Cl. .......................................................... 398/17
(58) Field of Classification Search .................. 398/25, 398/26, 65
See application file for complete search history.

(56) References Cited

U.S. PATENT DOCUMENTS

| | | | |
|---|---|---|---|
| 5,349,458 A | * | 9/1994 | Karlsson ...................... 398/13 |
| 6,560,554 B1 | * | 5/2003 | Anderson .................... 702/108 |
| 6,813,021 B2 | | 11/2004 | Chung et al. |
| 7,149,428 B2 | * | 12/2006 | Chung et al. .................. 398/68 |
| 2003/0016654 A1 | * | 1/2003 | Das et al. .................... 370/351 |
| 2006/0263096 A1 | * | 11/2006 | Dinu et al. ................... 398/187 |

OTHER PUBLICATIONS

T. Hirano et al., "Quantum Cryptography Using Pulsed Homodyne Detection", Physical Review, vol. 68, Issue 4, American Physical Society, Oct. 29, 2003.*
Kartalopoulos, Stamatios V., "Introduction to DWDM Technology—Data in a Rainbow", IEEE Press, New York, 2000, p. 81.

* cited by examiner

*Primary Examiner*—Shi K Li
(74) *Attorney, Agent, or Firm*—Aka Chan LLP

(57) ABSTRACT

Systems and methods for evaluating an optical communication link are provided. The evaluation is based on a polarization analysis of received optical power. Such an analysis is able to differentiate between received noise and received optical signal power, even for typical multi-channel signals. By appropriately analyzing the polarization of received optical power, the link quality can be evaluated. Failures may be detected and optical signal to noise ratio may be measured.

9 Claims, 5 Drawing Sheets

OPTICAL FAILURE DETECTION USING POLARIZATION

BACKGROUND OF THE INVENTION

The present application relates to optical networking and, more particularly, in certain embodiments, to systems and methods for determining the status of an optical communication link.

In addition to providing high-speed data communication between remote points, modern optical networks are also expected to provide a very high degree of reliability. To provide this reliability, many optical protection mechanisms have been developed, such that a failed channel or even all the channels may be sent down an alternate "protection" path in the event of a failure. The action taken in diverting traffic in this way is referred to as protection switching.

Before protection switching can occur in response to a failure, the failure must be detected. One important attribute of a failure detection scheme is that it should be very fast. The time taken to detect a failure is part of the overall time to switch in response to the failure. If the total protection switchover time is too long, a significant amount of data will be lost and the user experience will be affected. The failure detection mechanism should also be very reliable. No failure should be missed and there should be no false indications of failure. It is difficult to maintain this reliability in the presence of optical noise as exists in real-world optical communication links since crude analysis may mistake the noise for the desired signal. It is also desirable that a failure detection method be adaptable for both multi-channel and single-channel use.

Numerous failure detection mechanisms have been developed. Perhaps the simplest scheme is to use photodiodes to measure optical power. If optical power is lost then there is deemed to be a failure. This technique, however, is not able to differentiate optical noise, e.g., amplified spontaneous emission (ASE) noise, from the signal content of optical channels. This drawback is particularly problematic when one considers that modern optical communication links include cascaded optical amplifiers. Optical amplifiers, such as Erbium-doped fiber amplifiers (EDFAs), emit optical noise power in the form of ASE noise, noise that is elevated when their input power is lost due to a fiber cut. Such noise may be further amplified by successive amplification stages. A simple power measurement technique is thus unworkable for failure detection.

Another class of optical failure detection methods relies on optical spectrum analysis. In one implementation of this type of analysis, a monitor signal is tapped off for input to an optical spectrum analyzer (OSA). When the channels known to be present at the input are all missing from a spectrum as developed by such an analyzer, a failure is determined. Alternatively, individual monitors may be coupled to each optical channel following the demultiplexing stage of a link receiver. Such monitors are also, however, affected by ASE noise that passes through the demultiplexer. Furthermore, the spectral analysis techniques are slow and require expensive equipment.

Other techniques rely on monitoring of the recovered data across the multiple channels. A fiber cut can be determined when an alarm indication is generated on the receivers for each of the channels signifying loss of data reception. One can also rely on special overhead information that is then detected by photodiodes and dedicated circuitry. These techniques require specialized electronic equipment.

Systems and methods for reliably and quickly detecting failures in an optical communication link are needed.

SUMMARY OF THE INVENTION

Embodiments of the present invention provide systems and methods for evaluating an optical communication link. The evaluation is based on a polarization analysis of received optical power. Such an analysis is able to differentiate between received noise and received optical signal power, even for typical multi-channel signals. By appropriately analyzing the polarization of received optical power, the link quality can be evaluated. Failures may be detected and optical signal to noise ratio may be measured.

A first aspect of the present invention provides a method for monitoring performance of an optical communication link. The method includes: obtaining an optical signal from the optical communication link, evaluating a polarization state of the optical signal, and based on the evaluating of the polarization state, determining a quality of the optical communication link.

A second aspect of the present invention provides apparatus for monitoring performance of an optical communication link. The apparatus includes: a polarization beam splitter that isolates two polarization components of the monitor signal and a differential amplifier that amplifies a difference of electronic signals derived from the two polarization components.

A third aspect of the present invention provides apparatus for monitoring performance of an optical communication link. The apparatus includes: a polarization beam analyzer that isolates a polarization component of the monitor signal and an amplifier that provides an electrical signal to indicate intensity of the polarization component. A failure of the optical communication link is detected based on output of the amplifier.

Further understanding of the nature and advantages of the inventions herein may be realized by reference to the remaining portions of the specification and the attached drawings.

DESCRIPTION OF SPECIFIC EMBODIMENTS

Figure 1:
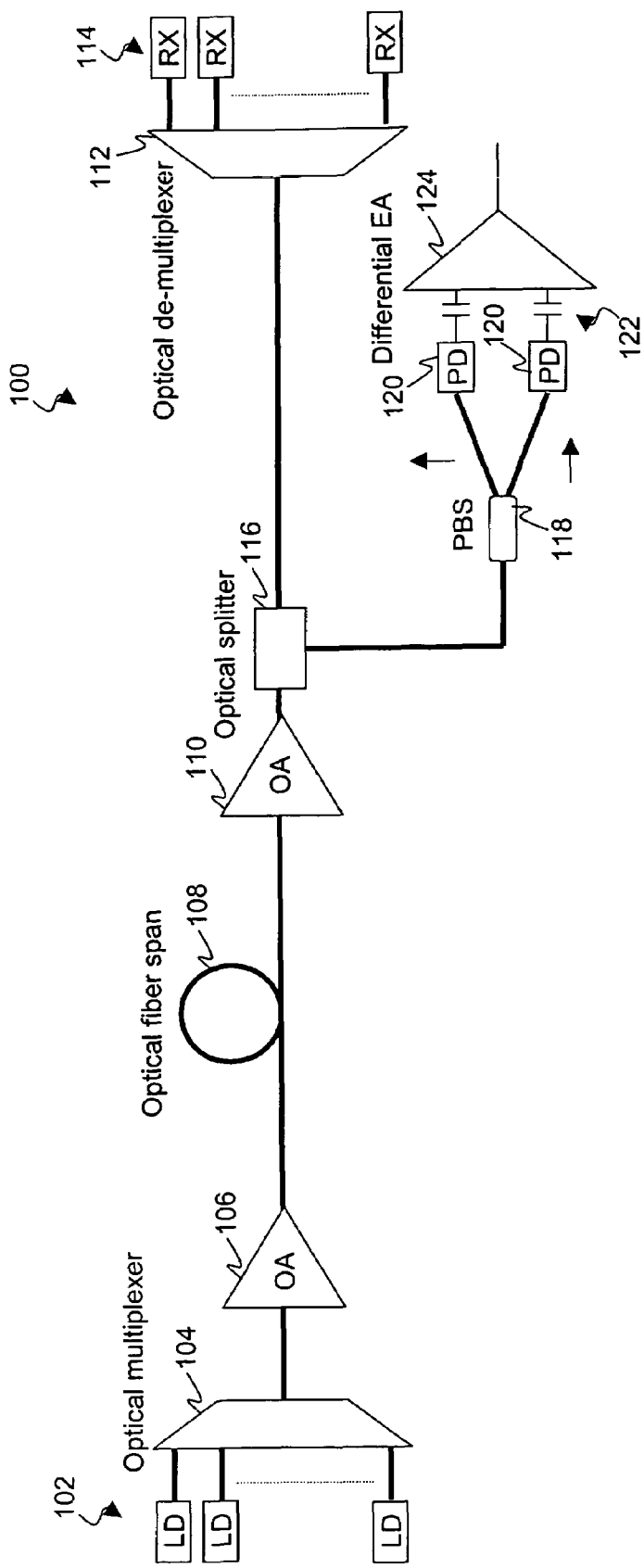
FIG. 1 depicts apparatus for analyzing the polarization of received optical signal power using a polarization beam splitter according to one embodiment of the present invention.

FIG. 1 depicts a representative optical communication link 100. An optical transmitter station includes multiple laser diodes 102 for generating optical signals on assigned wavelengths. These signals are typically modulated with data to transmit by modulators which are not shown. The various single wavelength signals are combined into a multi-wavelength signal by a multiplexer 104 and this multi-wavelength signal can be amplified by an optical amplifier 106 prior to transmission into an optical fiber span 108. It will of course be appreciated that this is a highly simplified representation of a DWDM transmission system.

Optical communication link 100 is depicted as having a single span 108, but it will be appreciated that there may be multiple such spans with optical amplifiers located at appropriate points between the spans to boost the signal. On the receiver end, an optical amplifier 110 boosts a signal prior to input into a demultiplexer 112. Demultiplexer 112 divides the multi-wavelength signal into individual wavelength components. Each such wavelength component is sent to a receiver 114. Each of the receivers 114 detects the signal on its particular wavelength and demodulates the data. Like with the optical transmission system, the optical receiver system has been highly simplified for ease of illustration.

Between optical amplifier 110 and optical demultiplexer 112, there is an optical splitter 116. Optical splitter 116 is positioned to tap off a portion of the received optical power for evaluation as a monitor signal. In one particular implementation, optical splitter 116 taps off 10% of the received optical power for analysis purposes.

Optical splitter 116 is positioned to facilitate analysis of all the wavelengths of the received signal. However, in alternative embodiments, one may position an optical splitter 116 such that individual channels or sub-groupings of channels are analyzed instead. For example, optical splitter 116 may be positioned between optical demultiplexer 112 and one of the receivers 114 to facilitate analysis of one particular channel. It is also possible to position optical splitter 116 between demultiplexing stages within demultiplexer 112 to allow for analysis of particular groupings of channels.

According to embodiments of the present invention, the analysis takes advantage of polarization properties of the received signal. The polarization of an optical signal is represented as a three-dimensional vector. However, this is typically simplified to only horizontal and vertical components. Each of laser diodes 102 will have a characteristic polarization. Noise power, such as ASE, is due to spontaneous light emission. Each generated photon is statistically independent from other generated photons. ASE can therefore be understood to be a sum of numerous randomly polarized signals such that the overall received ASE is unpolarized. The propagation of noise and signals down the fiber does not remove their polarization, but rather modifies the polarization vector. Noise power as it progresses down the fiber will continue to be unpolarized, whereas signal power will continue to be polarized.

In FIG. 1, the monitor signal derived from optical splitter 116 is input to a polarization beam splitter (PBS) 118. Representative implementations of polarization beam splitters are available from e.g., Furukawa, Senko, and YKK, all of Japan. Polarization beam splitter 118 separates the monitor signal into horizontal and vertical polarization components. Each such component is presented to a photodiode 120. The two electrical signals output by photodiodes 120 are input to a differential electronic amplifier 124 through coupling capacitors 122.

This differential amplification arrangement is highly effective at separating out contributions of noise and signal power. For the unpolarized ASE noise, the horizontal and vertical polarization components will be equal due to the stochastical quality of noise and thus cancelled out by the differential amplification. The polarization of the received signal power will, however, manifest itself as the difference between the horizontal and vertical component electrical signals. The signal at the output of amplifier 124 will, in the absence of a failure, vary over time to reflect changes in optical signal polarization along the line. These changes are typically due to slow temperature variation and mechanical stress, such as fiber vibration. As polarization changes due to these factors, the intensities measured on the outputs of polarization beam splitter 118 vary. This variation is not independent: if the intensity increases on one branch then it decreases on the other branch to maintain constant total optical power. For this reason, there will be zero-crossings at the output of differential electronic amplifier 124.

A failure criterion that may be used is to count the zero-crossings and determine the failure when they are absent for a time interval. The time interval may be on the order of seconds or even minutes due to the slow nature of the polarization variations. To detect failures, the output of differential electronic amplifier 124 should be connected to a zero-crossing counter (not shown). Alternatively, the output of differential electronic amplifier 124 could be coupled to an analog to digital converter. Then the zero-crossing counting process could occur in the digital domain under the control of, e.g., a suitably programmed microprocessor.

Figure 2:
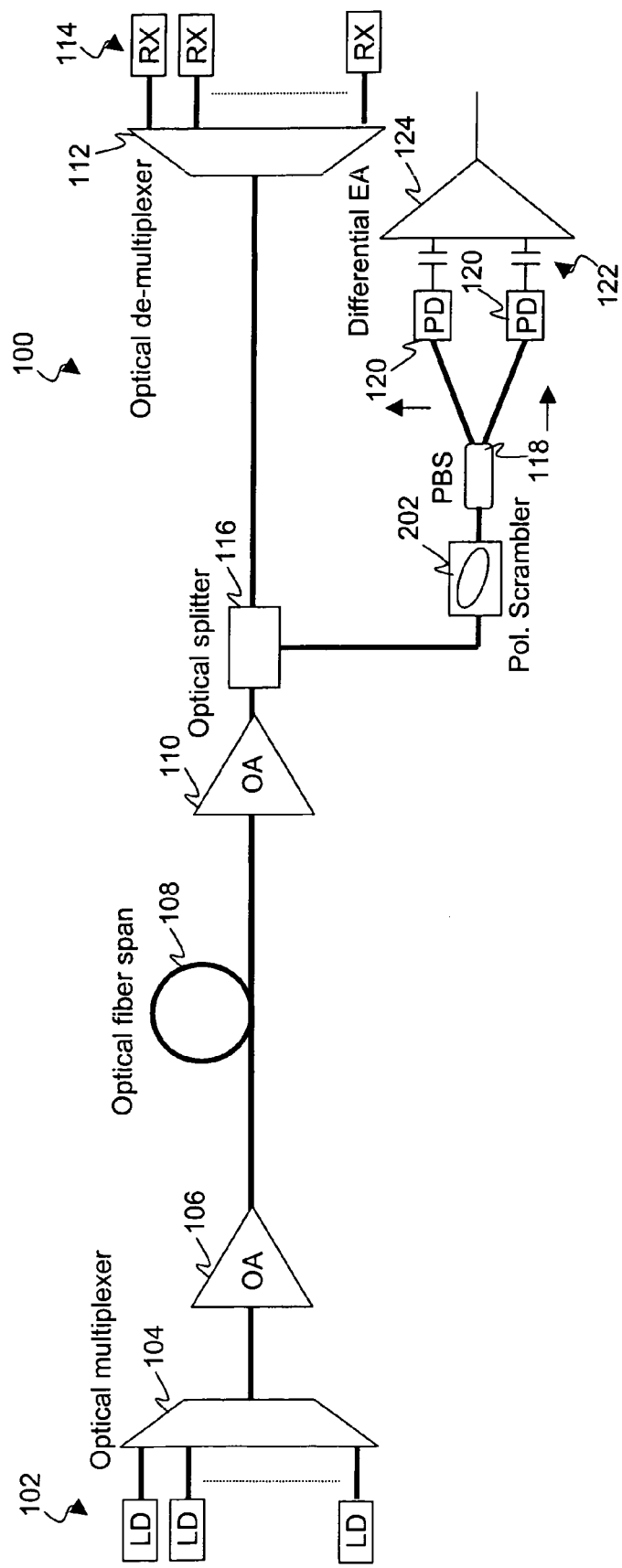
FIG. 2 depicts apparatus for analyzing polarization of a received optical signal using a polarization beam splitter in conjunction with a polarization scrambler according to one embodiment of the present invention.

It is desirable to increase the time variation in polarization so that zero crossings occur more frequently when optical signals are being received. In the embodiment of FIG. 2, a polarization scrambler 202 is positioned between optical splitter 116 and polarization beam splitter 118. Representative implementations of polarization scrambler 202 include the PC1000C provided by Optellios of Ewing, N.J. and the Acrobat™ series provided by Boston Applied Technologies of Woburn, Mass. Polarization scrambler 202 continuously scrambles the polarization of the monitor signal, shifting the polarization vector over time at a frequency on the order of kilohertz. This results in a constant transfer of power between the two polarization beam splitter output branches. The time variation of the differential signal is thus increased such that zero-crossings at the output of electronic amplifier 124 become more frequent. A determination of failure can be made in a time interval on the order of milliseconds. Even more desirably, failure detection becomes deterministic.

The failure detection scheme of FIG. 2 has been shown to work well for multiple channels, e.g. 12 channels. Eventually, as the number of channels increases, the summing of so many wavelength polarizations will result in a noise-like effect. It is believed, however, that even for as many as 160 channels, polarization analysis will provide accurate failure detection measurement.

Figure 3:
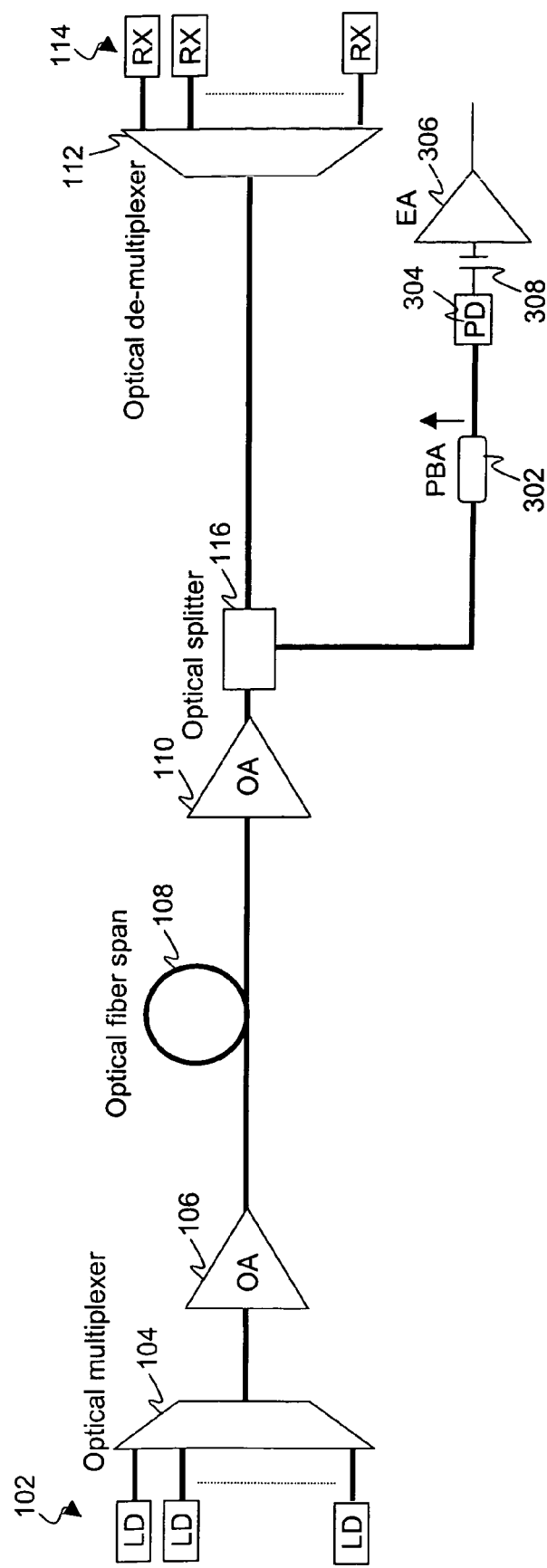
FIG. 3 depicts apparatus for analyzing the polarization of a received optical signal using a polarization beam analyzer according to one embodiment of the present invention.

FIG. 3 depicts an alternative embodiment where a polarization beam analyzer 302 is employed instead of a polarization beam splitter. An example implementation of polarization beam analyzer 302 is the In-Line Polarizer available from Senko of Japan. Polarization beam analyzer 302 provides a single polarization component output, e.g., a vertical component. This vertical component is detected by photodetector 304 and capacitively coupled to an electronic amplifier 306 by a capacitor 308. One can use the output of electronic amplifier 306 to count zero-crossings and, thus, detect whether a time-varying polarization is present on the monitor signal. This approach does not provide the performance of the previously described schemes employing a polarization beam splitter, but can be beneficially applied to low-cost systems due to its simplicity.

Figure 4:
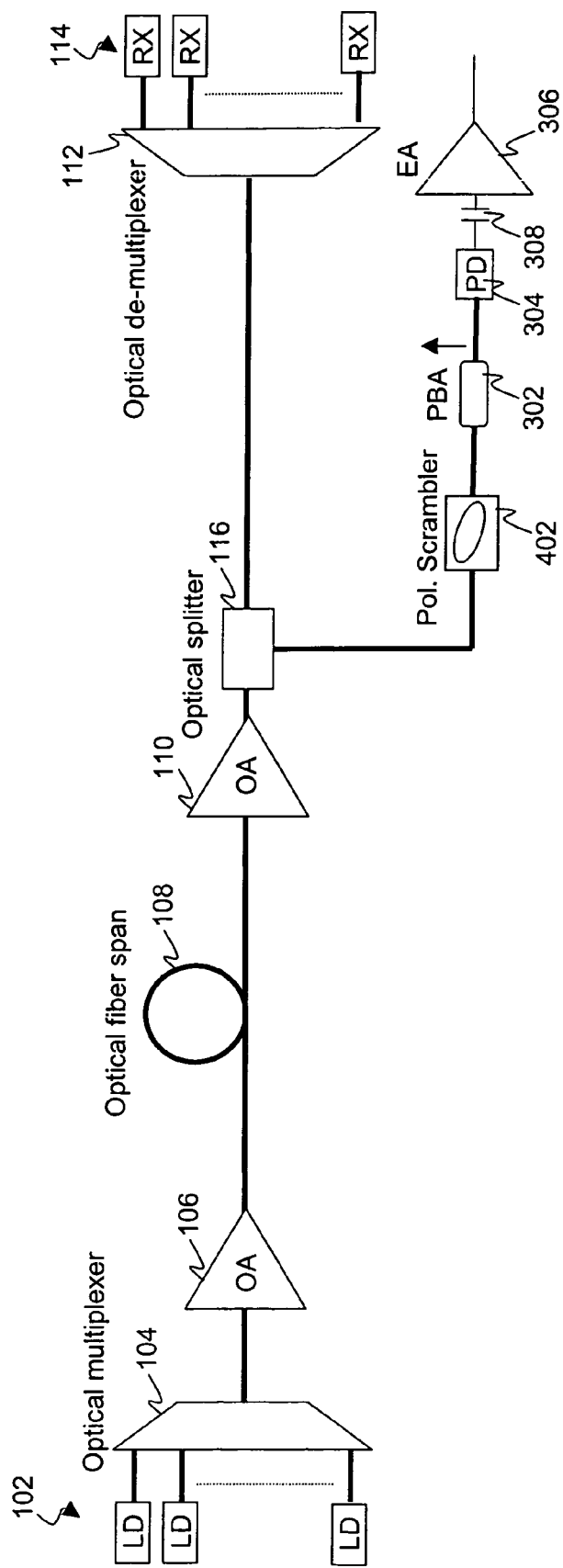
FIG. 4 depicts apparatus for analyzing the polarization of a received optical signal using a polarization beam analyzer in conjunction with a polarization scrambler according to one embodiment of the present invention.

FIG. 4 depicts a variation of the scheme of FIG. 3 where a polarization scrambler 402 is positioned between optical splitter 116 and polarization beam analyzer 302. Polarization scrambler 402 increases the degree of time variation in the signal output by electronic amplifier 306 and thus facilitates more rapid (and certain) failure detection.

Figure 5:
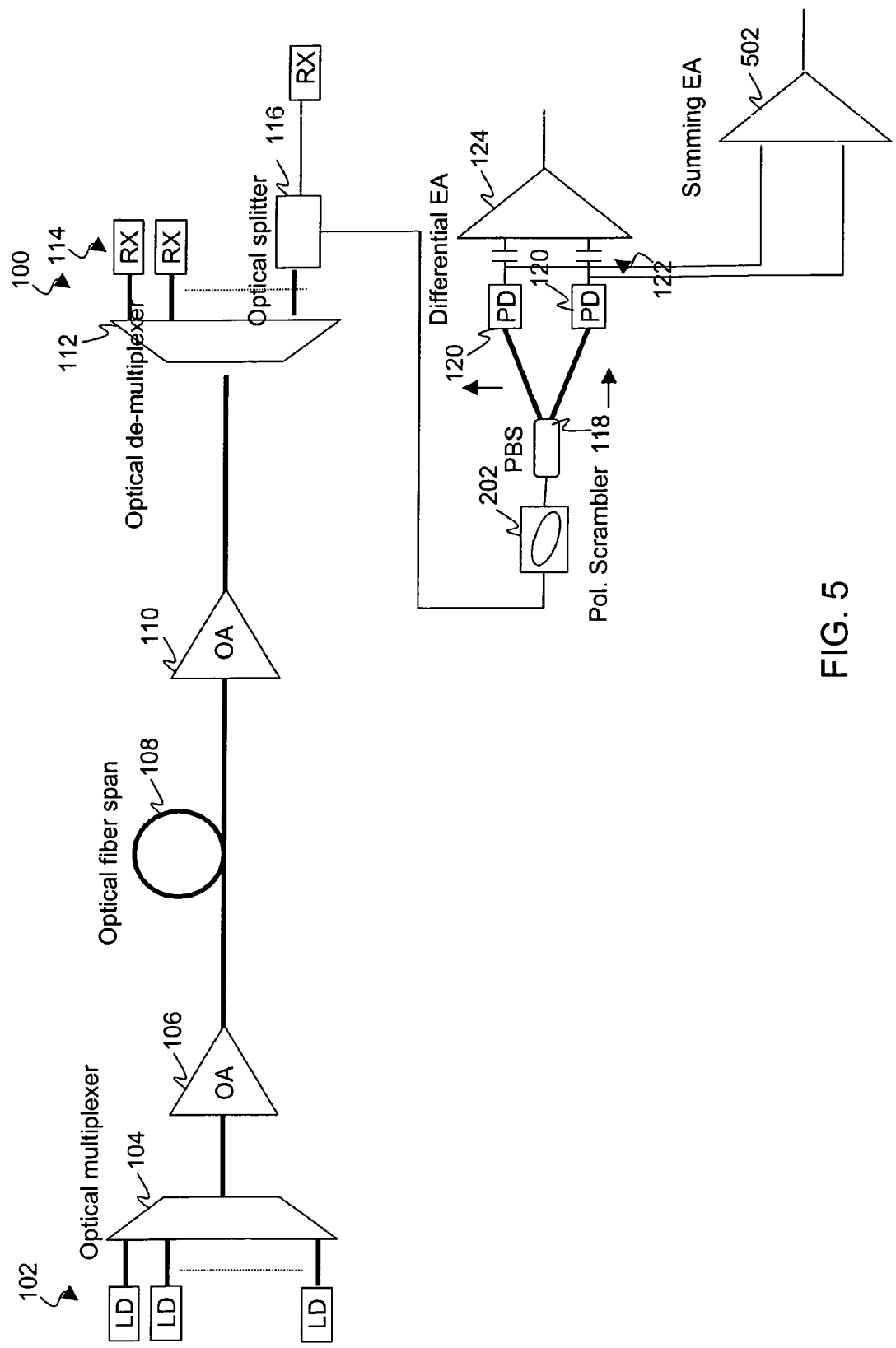
FIG. 5 depicts polarization analysis of a single channel according to one embodiment of the present invention.

FIG. 5 depicts polarization analysis of a single channel according to one embodiment of the present invention. The polarization measurement arrangement of FIG. 2 is modified such that optical splitter 116 is now positioned between optical demultiplexer 112 and one of receivers 114. Polarization analysis as depicted in FIG. 5 can be used detect failures in the manner described above and to measure the optical signal-tonoise ratio of the monitored channel. Optical signal-to-noise ratio measurement exploits the output of differential amplifier 124 as well as the output of a summing amplifier 502. Summing amplifier 502 receives the detected outputs of polarization beam splitter 118 and provides a sum signal in response.

One signal to noise ratio measurement technique exploits the following definitions and formulas:

$P_1$ is the total optical power (signal plus noise) on polarization beam splitter branch #1.

$$P_1 = P_{Sig1} + P_{ASE1}$$

$P_2$ is the total optical power (signal plus noise) on polarization beam splitter branch #2

$$P_2 = P_{Sig2} + P_{ASE2}$$

If appropriate calibration corrects for differences between the two polarization beam splitter branches, the responsivity of the photodiodes, and amplifier gain;

then $P_{ASE1} = P_{ASE2}$ $$P_1 + P_2 = P_{SigTOT} + P_{ASETOT}$$

$$P_1 - P_2 = P_{Sig1} - P_{Sig2}$$

Since all ASE is eliminated from $P_1-P_2$:

$$-P_{SigTOT} \leq (P_1 - P_2) \leq + P_{SigTOT}$$

$$(P_1 - P_2)_{peak\text{-}to\text{-}peak} = 2 * P_{SigTOT}$$

Thus, one can derive $P_{SigTOT}$ to be $(P_1-P_2)_{peak\text{-}to\text{-}peak}/2$. The noise power, $P_{ASETOT}$, can then be derived as $(P_1+P_2)-P_{SigTOT}$. Signal-to-noise ratio is then available as the ratio of the total signal power to the total noise power (in the equivalent optical bandwidth of the demultiplexer filter). The use of polarization scrambler 202 minimizes the time over which the amplifier outputs need be measured and improves accuracy of the calculated signal-to-noise ratio. Calculations may be performed by use of a suitably programmed microprocessor. Code for performing the calculations may be stored on a computer-readable storage medium such as, e.g, ROM, flash memory, RAM, a magnetic drive, an optical drive, etc. Another example of a storage medium is a signal used to distribute code over a network such as the Internet. Such code may also be used for counting zero-crossings and detecting failures. To make the values of $(P_1-P_2)_{peak\text{-}to\text{-}peak}$ and $(P_1+P_2)$ available for calculations suitable analog to digital converters are connected to the output of amplifiers 124 and 502.

It will be appreciated that the polarization analysis techniques that have been presented can be used to evaluate the quality of an optical communication link, including evaluating particular channels or groups of channels on that link. The link could also be a single channel link. The polarization analysis is insensitive to ASE noise and typical variations in optical power. Also, a completely optical solution is provided without the need to insert overhead signals or correlate recovered data across multiple channels. The approach is cost-effective due to reliance on off-the-shelf parts.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, the techniques presented herein may also be applied to Raman amplified systems or systems that combine Raman amplification and amplification by EDFAs. ASE noise due to Raman amplification effects will exhibit the same polarization characteristics as EDFA ASE noise and thus be distinguishable from signal power by the polarization analysis techniques presented herein. Link failures can be detected for the purpose invoking protection mechanisms and also to shut down Raman pump energy sources for safety.

The invention claimed is:

1. A method for monitoring performance of an optical communication link, said method comprising:
   obtaining an optical signal including a plurality of wavelength channels from said optical communication link;
   passing said plurality of wavelength channels of said optical signal through a polarization beam splitter to separate two polarization components;
   measuring a signal indicative of differences between said polarization components; and
   determining whether there has been a failure of said optical communication link responsive to said signal indicative of said differences between said polarization components.

2. The method of claim 1 wherein obtaining said optical signal comprises:
   tapping off said optical signal from said optical communication link as a monitor signal.

3. The method of claim 1 wherein said failure determining step comprises:
   counting zero crossings of said signal indicative of said differences between said polarization components for a predetermined time interval.

4. Apparatus for monitoring performance of an optical communication link, said apparatus comprising:
   a tap to obtain a monitor signal from said communication link;
   a polarization beam splitter that isolates two polarization components of said monitor signal;
   a differential amplifier that amplifies a difference of electronic signals derived from said two polarization components; and
   a component responsive to an output of said differential amplifier to determine a failure of said optical communication link from zero crossings at said output.

5. The apparatus of claim 4 wherein zero-crossings in output of said differential amplifier indicate presence of signal on said optical communication link.

6. The apparatus of claim 4 wherein said monitor signal comprises multiple wavelengths carried by said optical communication link.

7. The apparatus of claim 4 wherein said component comprises a counter to count said crossings.

8. The apparatus of claim 4 wherein said component comprises an analog to digital converter to determine said failure digitally.

9. Apparatus for monitoring performance of an optical communication link, said apparatus comprising:
   means for obtaining an optical signal including a plurality of wavelength channels from said optical communication link;
   means for passing said plurality of wavelength channels of said optical signal through a polarization beam splitter to separate two polarization components;
   means for measuring a signal indicative of differences between said polarization components; and
   means for determining whether there has been a failure of said optical communication link responsive to said signal indicative of said differences between said polarization component.

* * * * *